Aug. 12, 1969     G. F. WIEGER     3,460,653
BRAKE ADJUSTER
Filed July 28, 1967
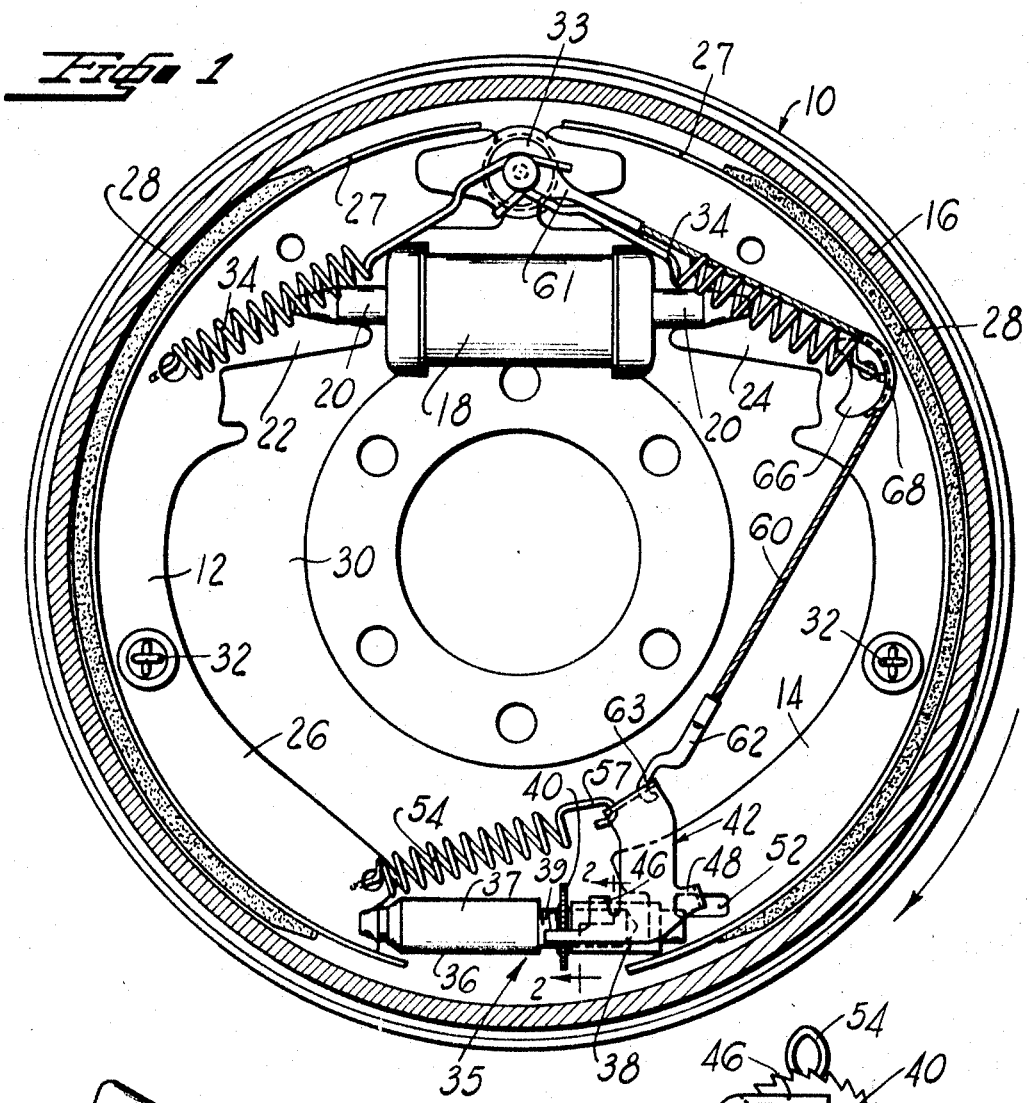
Fig. 1
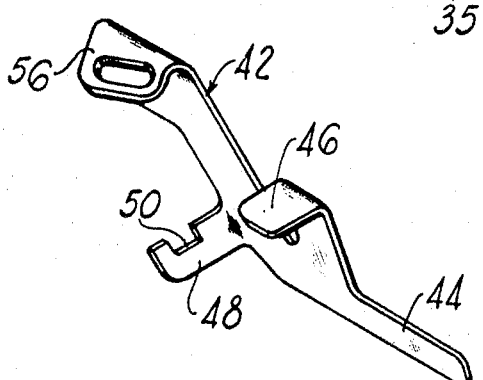
Fig. 3
Fig. 2
INVENTOR.
GEORGE F. WIEGER
BY Cecil Areng
ATTORNEY

United States Patent Office 3,460,653
Patented Aug. 12, 1969

3,460,653
BRAKE ADJUSTER
George F. Wieger, South Bend, Ind., assignor to The Bendix Corporation, a corporation of Delaware
Filed July 28, 1967, Ser. No. 656,852
Int. Cl. F16d 51/46, 65/38
U.S. Cl. 188—79.5    5 Claims

ABSTRACT OF THE DISCLOSURE

A brake equipped with an automatic adjusting device interposed between adjacent ends of a pair of brake shoes to compensate for shoe wear, comprising an adjustable strut interconnecting said adjacent shoe ends and a lever provided with a pawl and a locating element, the latter of which establishes said pawl in engagement with said adjustable strut to adjust the same, said lever being pivotally carried on one of said shoes and operatively connected to said other shoe and to a fixed part of said brake via said one shoe to thereby impart rotation of said lever in response to shoe movement.

SUMMARY OF THE INVENTION

It is a purpose of this invention to provide an adjuster for brake shoe wear which includes a safety feature operative to prevent destruction of said adjuster in the event of malfunction.

A very important object of the invention is to provide an automatic brake adjuster with a positive positioning means which establishes an actuating lever in a predetermined position after each brake application.

Another very important object of this invention is to provide a brake shoe adjuster having an actuating lever which is operative upon a brake application to release the applied torque beyond a predetermined value to thereby prevent destruction of said adjuster.

BRIEF DESCRIPTION OF THE DRAWINGS

FIGURE 1 is a plan view of a brake assembly utilizing the brake adjuster of my invention;

FIGURE 2 is a partial sectional view taken along the line 2—2 of FIGURE 1 and showing the relationship of the locating element to the strut; and FIGURE 3 is an isometric detail view of the lever shown in FIGURE 1.

DESCRIPTION OF THE PREFERRED EMBODIMENT

Referring now to the drawing, and particularly FIGURE 1 thereof, the numeral 10 represents a drum brake provided with brake shoes 12 and 14, which are urged against drum 16 in any suitable manner such, for example, as by means 18, which in this case is a hydraulic wheel cylinder. The wheel cylinder provides the actuating means for moving the shoes into engagement with the drum. The wheel cylinder 18 is conventional in form and is equipped with connecting links 20 which engage the respective ends 22 and 24 of the shoes 12 and 14. The shoes are identical in construction and consist of a web 26, rim 27, and friction lining 28.

The shoes 12 and 14 are held in sliding engagement against backing plate 30 by a pair of hold-down devices 32 which pass through the respective webs of the shoes. A fixed anchor member 33 is secured to the backing plate 30 to receive the braking torque of the shoes through one or the other of the shoe ends 22 and 24, depending upon direction of rotation of the drum 16. If the drum is rotating in a clockwise direction, the two shoes 12 and 14 anchor as a unit at the end of shoe 12 against the fixed anchor member 33. With the drum rotating clockwise, as aforesaid, the shoe 14 acts as a "primary shoe" and the shoe 12 acts as a "secondary shoe." Springs 34 are connected between the anchor 33 and the ends 22 and 24 respectively of the shoes 12 and 14 to thereby hold said shoes in retracted position against the anchor 33 and out of contact with the drum.

An automatic brake shoe adjuster 35 is interposed between the ends of the shoes opposite the anchor member 33 for making the necessary adjustments to the shoes as they become worn. The adjuster 35 includes an extendible strut 36 which comprises an internally threaded tubular member 37, one end of which is forked for engagement with brake shoe web 26 of shoe 12. A second tubular member 38 is provided with a hollow smooth internal portion and a forked end portion which engages the web 26 of the shoe 14. In addition to the parts 37 and 38, the extendible strut also includes an adjusting screw 39 which threadedly engages the tubular member 37 and is formed with a smooth shank portion which is received in the hollow internal portion of the second tubular member 38. The adjusting screw 39 is provided with a wheel 40 to provide rotation of the adjusting screw when the brake is adjusted for wear.

The adjuster 35 further comprises a lever 42 which is pivotally carried at the lower end of the shoe 14. The lever is provided with a pawl 44, a locating element 46, and a tab 48, the latter of which is notched at 50 for pivotal engagement with the web member 26 of shoe 14 through an opening 52. The web rides in the notch 50, which positions the lever laterally with respect to the web 26 of the shoe 14, so as to restrict rotation of the lever within a plane which passes through the brake shoes. A spring 54 is connected between the lower end of shoe 12 and a turned-in portion 56 of the lever 42. An opening 55 in the turned-in portion 56 receives hook 57 of the coil spring 54. When connected in this manner, the spring 54 tends to rotate the lever 42 in a counterclockwise direction so that the locating element 46 engages the tubular member 38 to thereby position the pawl 44 in engaging relationship with a tooth 58 formed in the irregular periphery of the wheel 40. The connection of the spring 54 between the lever 42 and end of shoe 12 is such as to bring the pawl 44 into driving engagement with the irregular periphery of the wheel. An additional function of the spring 54 is to hold the lower ends of the shoes 12 and 14 into operative relationship with the extendible strut 36.

A cable 60 has one end fastened to the turned-in portion 56 of the lever 42 and the other end of the cable securely fixed to the anchor member 33 through a grommet 61. The end of the cable 60 which is connected to the lever 42 is provided with a fastener 62 formed with a hook 63 which passes through the opening 55 of the turned-in portion 56. A cable guide 66 is carried at the upper end of the web 26 of the shoe 14 so as to receive the cable 60 intermediate its ends. The cable guide is formed with a curved flange portion 68 within which the cable can slide.

Due to the oblong nature of the opening 52 in shoe 14 into which the tab or projection 48 protrudes, the lever 42 can slide in the notch 50 to accommodate any tolerance stackup due to slight manufacturing variations in length of cable 60. Moreover, the lever 42 can slide horizontally along the opening 52 in the notch 50 to relieve any excessive torque applied to the lever, should the extendible member malfunction in some manner so as to preclude rotation of the wheel 40 upon a brake application. In other words, if the lever 42 cannot be rotated as a result of shoe wear due to malfunctioning of the extendible member 36, for example, the lever can slide to the right along the elongated slot 52 to relieve excessive torque applied to cable 60, thus performing in much the same manner as a slip clutch would operate. In assembling the adjuster to the brake, the spring 54 assumes a preload which rotates the lever 42 about tab 48 so that the locating element 46 engages the tubular member 38 to thereby position pawl 44 in driving engagement with one of the teeth 58. The cable 60 which has its ends interconnected respectively to the lever 42 and the anchor 33 via the cable guide 66 opposes the preload on the spring 54.

The automatic adjuster described is intended to adjust on brake application during reverse movement of a vehicle. It is especially important to provide some means to relieve excessive torque applied to brake adjusters which function upon brake application because such torques can become extremely high as compared to the torque applied to an adjuster by energy stored in a spring during brake application which is used to operate the brake adjuster upon release of the brakes.

The locating element 46 is effective as a self-positioning actuator lever which serves to position the lever in a vertical direction as well as establish a preload on the lever return spring 54. The tab 48 and spring 54 establish the lever 42 in a horizontal plane so as to compensate for tolerance buildup at the connecting point on the lever between the hook 63 and the turned-in portion 56.

OPERATION

The brake adjuster operates on reverse rotation of the vehicle brake drum, as indicated by the arrow. Upon application of the vehicle brakes, the hydraulic wheel cylinder 18 is put under pressure so that the brake shoes 12 and 14 are urged into frictional engagement with the inner periphery of the drum 16. This frictional engagement of the brake shoes with the inner periphery of the drum 16 products a slight rotation of the brake shoes in the direction of drum rotation. In this particular case, the brake shoes 12 and 14 as a unit tend to rotate in a clockwise direction with the end 22 of the shoe 12 anchoring at the fixed anchor 33. The end 24 of shoe 14 will have pulled away from fixed anchor 33 at this time against the force of the spring 34. This action of the shoes 12 and 14 will tend to rotate the lever 42 about the tab 48. The amount of rotation of lever 42 about the tab will depend upon the extent to which the shoes 12 and 14 have rotated with the drum 16. If lining wear has been such as to cause the pawl 44 to rotate the wheel 40 to extend the strut 36 during the brake application, the spring 54 will return the lever 42 so that the locating element 46 will re-establish the pawl 44 in the next tooth appearing in a counterclockwise direction in FIGURE 2.

Upon release of the brakes and a diminution of pressure in the wheel cylinder 18, the springs 34 return the shoe ends 22 and 24 against the fixed anchor member 33.

Although only a single embodiment of my invention has been illustrated, it will be apparent to those skilled in the art that the principles of the invention are broad in scope and are capable of general application.

I claim:

1. In a brake, a pair of brake shoes, a fixed anchor member to which each shoe is operatively connected at one end, an automatic adjuster for said shoes comprising an extendible strut interconnecting the unanchored ends of said brake shoes, a rotary wheel having an irregular periphery operatively related to said extendible strut to induce extension of said strut upon rotation of said wheel, a lever pivotally and slidably carried on one of said shoes and provided with a pawl which is engageable with said irregular periphery of said wheel, said lever including a locating element normally positioned in engagement with said extendible strut to retain said pawl in a given relationship to said irregular periphery of said wheel, said locating element slidably positioning said lever along said strut to maintain said pawl in said given relationship to said irregular periphery, means interconnecting said lever to the other of said shoes, and means interconnecting said lever to said fixed member via said one shoe so that movement of said one shoe away from its anchor member a given amount rotates said lever and pawl in a direction to turn said wheel to thereby adjust the brake.

2. The structure as recited in claim 1 wherein said means interconnecting said lever to the other of said shoes comprises a preloaded spring which rotates said lever so that the locating element engages said strut as a stop to thereby position said lever and pawl in operative engagement with said wheel.

3. The structure as recited in claim 1 wherein said shoe on which said lever is pivoted is provided with an elongated opening in which said lever is pivotally carried to relieve excessive torque applied to said lever through said means interconnecting said lever to said fixed member upon movement of said one shoe away from its anchor.

4. The structure as recited in claim 1 wherein said means respectively interconnecting said lever to said other shoe and to said fixed member via said one shoe combine to act as a slip clutch upon application of excessive torque to said lever to thereby prevent its destruction.

5. In a brake, a pair of brake shoes, a fixed anchor member to which each shoe is operatively connected at one end, an automatic adjuster for said shoes comprising an extendible strut interconnecting the unanchored ends of said brake shoes, a rotary wheel provided with an irregular periphery operatively connected to said extendible strut to induce extension thereof upon rotation of said wheel, a lever pivotally and slidably connected to one of said shoes and rotatable about said pivot in a plane which passes through said shoes, said lever including a pawl located at the end of said lever opposite its pivot and in engagement with said irregular periphery, a first element carried by said lever and extending transverse to said plane to be engaged by said strut, said first element slidably positioning said lever along said strut to maintain said pawl in a given position relative to said irregular periphery, a second element carried by said lever and extending transverse to said plane to provide said pivotal and said slidable connection for said lever, a preloaded spring interconnecting said lever to the other of said shoes, a cable having one end secured to said lever and its other end attached to said fixed anchor member, and a guide member carried by said one shoe for receiving said cable intermediate its ends.

References Cited

UNITED STATES PATENTS

| | | | |
|---|---|---|---|
| 2,938,610 | 5/1960 | Dombeck et al. | 188—79.5 |
| 3,103,992 | 9/1963 | Dombeck | 188—79.5 |
| 3,360,084 | 12/1967 | Ayers | 188—196 X |

DUANE A. REGER, Primary Examiner

U.S. Cl. X.R.

188—196